(12) United States Patent
Penna et al.

(10) Patent No.: US 11,108,600 B2
(45) Date of Patent: *Aug. 31, 2021

(54) SYSTEMS AND METHODS FOR TIME DOMAIN LAYER SEPARATION IN ORTHOGONAL FREQUENCY DIVISION MULTIPLEXING-BASED RECEIVERS

(71) Applicant: Samsung Electronics Co., Ltd., Suwon-si (KR)

(72) Inventors: Federico Penna, San Diego, CA (US); Hongbing Cheng, San Diego, CA (US); Kee-Bong Song, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/884,918

(22) Filed: May 27, 2020

(65) Prior Publication Data

US 2020/0287757 A1    Sep. 10, 2020

Related U.S. Application Data

(63) Continuation of application No. 16/239,441, filed on Jan. 3, 2019, now Pat. No. 10,700,896.

(Continued)

(51) Int. Cl.
*H04L 25/03* (2006.01)
*H04L 27/26* (2006.01)
(Continued)

(52) U.S. Cl.
CPC ........ *H04L 25/03866* (2013.01); *H04J 11/00* (2013.01); *H04J 13/0003* (2013.01);
(Continued)

(58) Field of Classification Search
None
See application file for complete search history.

(56) References Cited

U.S. PATENT DOCUMENTS 9,048,914 B2   6/2015   Kishiyama et al.
9,179,464 B2   11/2015  Noh et al.
(Continued)

FOREIGN PATENT DOCUMENTS

WO   WO 2017/057987 A1   4/2017
WO   WO 2018/064313 A1   4/2018
(Continued)

OTHER PUBLICATIONS

Takeda, Kazuaki, et al., "Investigation of Two-Dimensional Orthogonal Sequence Mapping Multi-layer Reference Signal for LTE-Advanced Downlink", 2010 IEEE 72nd Vehicular Technology Conference—Fall, Sep. 6, 2010, pp. 1-5.

(Continued)

*Primary Examiner* — Faruk Hamza
*Assistant Examiner* — Cassandra L Decker
(74) *Attorney, Agent, or Firm* — Lewis Roca Rothgerber Christie LLP

(57) ABSTRACT

A receiver circuit for separating a plurality of layers multiplexed in an orthogonal frequency domain multiplexed (OFDM) signal includes: a descrambling sub-circuit configured to descramble a plurality of signals received on non-adjacent subcarriers of the OFDM signal to generate a plurality of descrambled signals; an inverse fast Fourier transform sub-circuit configured to transform the descrambled signals from a frequency domain to a received signal including a plurality of samples in a time domain; and a layer separation sub-circuit configured to separate the layers multiplexed in the received signal by: defining a first time domain sampling window and a second time domain (Continued)

sampling window in accordance with a size of the inverse fast Fourier transform; extracting one or more first layers from the samples in the first time domain sampling window; and extracting one or more second layers from the samples in the second time domain sampling window.

20 Claims, 8 Drawing Sheets

Related U.S. Application Data

(60) Provisional application No. 62/758,263, filed on Nov. 9, 2018.

(51) Int. Cl.
| | |
|---|---|
| H04L 5/00 | (2006.01) |
| H04J 13/18 | (2011.01) |
| H04J 11/00 | (2006.01) |
| H04J 13/00 | (2011.01) |
| H04B 7/0452 | (2017.01) |
| H04L 25/02 | (2006.01) |

(52) U.S. Cl.
CPC ............ *H04J 13/18* (2013.01); *H04L 5/0041* (2013.01); *H04L 27/265* (2013.01); *H04L 27/2666* (2013.01); *H04B 7/0452* (2013.01); *H04J 2011/0009* (2013.01)

(56) References Cited

U.S. PATENT DOCUMENTS

| | | | |
|---|---|---|---|
| 9,246,654 B2 | 1/2016 | Hu et al. | |
| 9,258,095 B2 | 2/2016 | Zhang et al. | |
| 9,554,381 B2 | 1/2017 | Park et al. | |
| 9,967,046 B2 | 5/2018 | Lee et al. | |
| 2008/0212464 A1 | 9/2008 | Kim | |
| 2011/0176622 A1 | 7/2011 | Higashinaka | |
| 2011/0310825 A1 | 12/2011 | Hu | |
| 2013/0343320 A1 | 12/2013 | Nakamura et al. | |
| 2014/0003547 A1* | 1/2014 | Williams | H04L 27/2647 375/267 |
| 2014/0355408 A1 | 12/2014 | Tong et al. | |
| 2017/0093469 A1 | 3/2017 | Nazar et al. | |
| 2017/0187499 A1 | 6/2017 | Hwang et al. | |
| 2017/0273114 A1 | 9/2017 | Wang et al. | |
| 2018/0026684 A1 | 1/2018 | Wei et al. | |
| 2018/0041320 A1 | 2/2018 | Jin et al. | |
| 2018/0063820 A1 | 3/2018 | Xiong et al. | |
| 2020/0076558 A1* | 3/2020 | Kuchi | H04L 27/265 |

FOREIGN PATENT DOCUMENTS

| | | |
|---|---|---|
| WO | WO 2018/099481 A1 | 6/2018 |
| WO | WO 2018/127171 A1 | 7/2018 |

OTHER PUBLICATIONS

Li, Qiang, et al., "On Channel Estimation for Multi-User MIMO for LTE-A Uplink", 2014 IEEE 79th Vehicular Technology Conference—(VTC Spring), May 18, 2014, pp. 1-5.

3GPP TS 38.211: "Technical Specification Group Radio Access Network; NR; Physical Channels and Modulation (Release 15)", Section 7.4.1.1, pp. 82-86.

\* cited by examiner

SYSTEMS AND METHODS FOR TIME DOMAIN LAYER SEPARATION IN ORTHOGONAL FREQUENCY DIVISION MULTIPLEXING-BASED RECEIVERS

CROSS-REFERENCE TO RELATED APPLICATION(S)

This application is a continuation of U.S. patent application Ser. No. 16/239,441 filed Jan. 3, 2019, which claims priority to and the benefit of U.S. Provisional Patent Application No. 62/758,263, filed in the United States Patent and Trademark Office on Nov. 9, 2018, the entire contents of all of which are incorporated herein by reference.

FIELD

Aspects of embodiments of the present relate to the field of electronic communications.

BACKGROUND

Some forms of electronic communication systems encode digital data on multiple carrier frequencies using a technique known as orthogonal frequency division multiplexing (OFDM) in which multiple closely spaced orthogonal subcarrier signals with overlapping spectra are emitted to carry data. In addition, in some forms of electronic communications systems, multiple streams of data ("layers") are transmitted in parallel in an arrangement sometimes referred to as multiple-in-multiple-out (MIMO). In some circumstances, frequency division multiplexing (FDM) is used to transmit these multiple streams of data, where non-overlapping frequency bands are used to carry separate signals.

In order for the receiver to perform channel estimation for each layer, a demodulation reference signal (DMRS) may include multiple "ports" (one for each layer), where these ports are orthogonal to each other. This orthogonality can be achieved by using frequency division multiplexing (FDM), where different subcarriers are used in the frequency domain, or by using code division multiplexing (CDM) which uses orthogonal cover codes (OCC) in the time domain (TD-OCC) or frequency domain (FD-OCC).

Such modulation and demodulation techniques may be applied, for example, in wireless cellular communications technologies such as Long-Term Evolution (LTE®) and 5 G New Radio (NR).

SUMMARY

Aspects of embodiments of the present disclosure relate to systems and methods for demodulating frequency-division orthogonal cover coded signals.

According to one embodiment of the present disclosure, a method for separating a plurality of layers multiplexed using frequency domain orthogonal cover codes (FD-OCC) in an orthogonal frequency domain multiplexed (OFDM) signal includes descrambling a plurality of signals received on non-adjacent subcarriers of the OFDM signal based on multiplying by corresponding descrambling codes to generate a plurality of descrambled signals; applying an inverse fast Fourier transform to transform the descrambled signals from a frequency domain to a received signal including a plurality of samples in a time domain; and separating, in the time domain, the layers multiplexed in the received signal by: defining a first time domain sampling window and a second time domain sampling window in accordance with a size of the inverse fast Fourier transform; extracting one or more first layers from the samples in the first time domain sampling window; and extracting one or more second layers from the samples in the second time domain sampling window.

The first time domain sampling window may correspond to a first half of the samples of the received signal in the time domain, and the second time domain sampling window may correspond to a second half of the samples of the received signal in the time domain.

The first time domain sampling window may correspond to a first half of the samples of the received signal in the time domain, shifted by a leakage parameter, and the second time domain sampling window may correspond to a second half of the samples of the received signal in the time domain, shifted by the leakage parameter.

The leakage parameter may have a value of an integer nearest to 0.27 times a size of the inverse fast Fourier transform.

The method may further include applying a fast Fourier transform to the extracted one or more first layers and the extracted one or more second layers to transform the one or more first layers and the one or more second layers from the time domain to the frequency domain.

The method may further include de-noising the extracted one or more first layers and the extracted one or more second layers to generate one or more de-noised first layers and one or more de-noised second layers.

The method may further include applying a fast Fourier transform to convert the one or more de-noised first layers and the one or more de-noised second layers from the time domain to the frequency domain.

According to one embodiment of the present disclosure, a circuit for separating a plurality of layers multiplexed using frequency domain orthogonal cover codes (FD-OCC) in an orthogonal frequency domain multiplexed (OFDM) signal includes: a descrambling circuit configured to descramble a plurality of signals received on non-adjacent subcarriers of the OFDM signal based on multiplying the signals by corresponding descrambling codes to generate a plurality of descrambled signals; an inverse fast Fourier transform circuit configured to transform the descrambled signals from a frequency domain to a received signal including a plurality of samples in a time domain; and a layer separation circuit configured to separate the layers multiplexed in the received signal by: defining a first time domain sampling window and a second time domain sampling window in accordance with a size of the inverse fast Fourier transform; extracting one or more first layers from the samples in the first time domain sampling window; and extracting one or more second layers from the samples in the second time domain sampling window.

The first time domain sampling window may correspond to a first half of the samples of the received signal in the time domain, and the second time domain sampling window may correspond to a second half of the samples of the received signal in the time domain.

The first time domain sampling window may correspond to a first half of the samples of the received signal in the time domain, shifted by a leakage parameter, and the second time domain sampling window may correspond to a second half of the samples of the received signal in the time domain, shifted by the leakage parameter.

The leakage parameter may have a value of an integer nearest to 0.27 times a size of the inverse fast Fourier transform.

The circuit may further include a fast Fourier transform circuit configured to convert the one or more first layers and the one or more second layers from the time domain to the frequency domain.

The circuit may further include a de-noising circuit configured to de-noise the extracted one or more first layers and the extracted one or more second layers to generate one or more de-noised first layers and one or more de-noised second layers.

The circuit may further include a fast Fourier transform circuit configured to convert the one or more de-noised first layers and the one or more de-noised second layers from the time domain to the frequency domain.

According to one embodiment of the present disclosure, a wireless communication device includes: an antenna; a processor; a memory; a plurality of signal processing circuits coupled to the processor and the memory by a data bus, the signal processing circuits including a receiver configured to receive a plurality of layers multiplexed using frequency domain orthogonal cover codes (FD-OCC) in an orthogonal frequency domain multiplexed (OFDM) signal from the antenna, the receiver including: a descrambling circuit configured to descramble the signals received on non-adjacent subcarriers of the OFDM signal based on multiplying the signals by corresponding descrambling codes to generate a plurality of descrambled signals; an inverse fast Fourier transform circuit configured to transform the descrambled signals from a frequency domain to a received signal including a plurality of samples in a time domain; a layer separation circuit configured to separate the layers multiplexed in the received signal by: defining a first time domain sampling window and a second time domain sampling window in accordance with a size of the inverse fast Fourier transform; extracting one or more first layers from the samples in the first time domain sampling window; and extracting one or more second layers from the samples in the second time domain sampling window, the signal processing circuits being configured to transmit data streams decoded from the one or more first layers and the one or more second layers to the processor and the memory.

The first time domain sampling window may correspond to a first half of the samples of the received signal in the time domain, shifted by a leakage parameter, and the second time domain sampling window may correspond to a second half of the samples of the received signal in the time domain, shifted by the leakage parameter.

The leakage parameter may have a value of an integer nearest to 0.27 times a size of the inverse fast Fourier transform.

The wireless communication device may further include a fast Fourier transform circuit configured to convert the one or more first layers and the one or more second layers from the time domain to the frequency domain.

The wireless communication device may further include a de-noising circuit configured to de-noise the extracted one or more first layers and the extracted one or more second layers to generate one or more de-noised first layers and one or more de-noised second layers.

The wireless communication device may further include a fast Fourier transform circuit configured to convert the one or more de-noised first layers and the one or more de-noised second layers from the time domain to the frequency domain.

BRIEF DESCRIPTION OF THE DRAWINGS

The accompanying drawings, together with the specification, illustrate exemplary embodiments of the present disclosure, and, together with the description, serve to explain the principles of the present disclosure.

DETAILED DESCRIPTION

Figure 1:
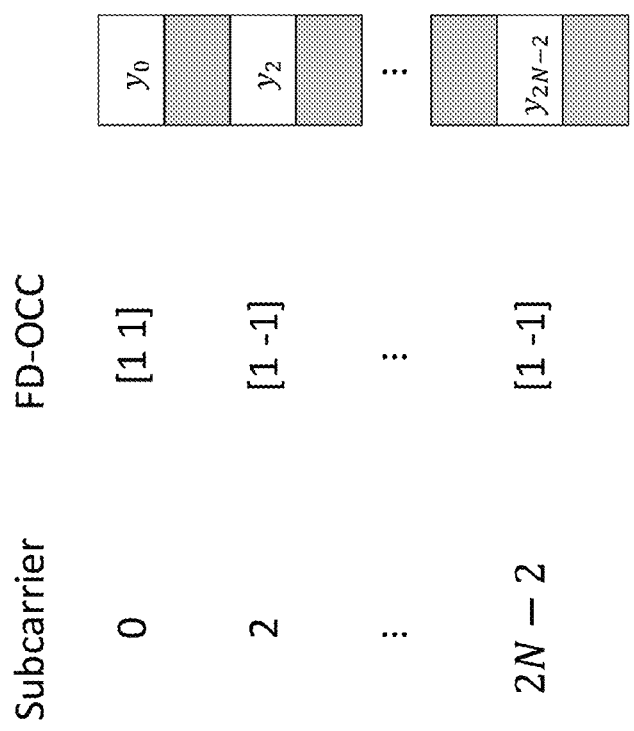
FIG. 1 is a schematic illustration of a New Radio (NR) demodulation reference signal (DMRS) configuration type 1 with two layers, N DMRS subcarriers, and a total of 2N subcarriers.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof will not be repeated.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

In orthogonal frequency domain modulation (OFDM), a data stream is split into multiple substreams or "layers" of lower data rate, and these separate substreams are transmitted on multiple adjacent subcarriers. When considered in the frequency domain, this can be thought of as transmitting the substreams in parallel. In some circumstances, frequency domain orthogonal cover codes (FD-OCC) are used to multiplex data streams over the OFDM subcarriers.

Signals that are transmitted on different subcarriers may experience different channels. For example, signals may experience fading (e.g., be attenuated) to different degrees in a frequency-dependent manner (e.g., where the attenuation is not uniform or flat across the frequency band). One form of fading is frequency selective fading, where a signal partially cancels itself by arriving at a radio receiver by at least two paths ("multipath"), which may be caused by reflections (e.g., the movement of layers in the ionosphere or, depending on the frequency of the signal, due to physical objects in the environment). Communication channels in which different spectral components of the channel are attenuated to different degrees may be referred to as frequency-selective channels. Other forms of attenuation may include interference from other sources of electromagnetic radiation.

As noted above, the demodulation reference signal (DMRS) includes multiple "ports," one for each layer, where these ports are modulated to be orthogonal to each other through frequency domain multiplexing (FDM), code division multiplexing using orthogonal cover codes in the time domain (TD-OCC) or in the frequency domain (FD-OCC), or combinations thereof.

The frequency-selectivity of the channels can result in at least a partial loss in orthogonality between the DMRS ports, and may be especially severe in the case of applying FD-OCC to non-adjacent subcarriers, such as in DMRS configuration type 1 specified in the Technical Specification for 5 G NR (See, e.g., 3GPP TS 38.211: "Technical Specification Group Radio Access Network; NR; Physical Channels and Modulation (Release 15)," Section 7.4.1.1). In other words, frequency selectivity may make it difficult to recover a data stream that is spread by FD-OCC across two, non-adjacent subcarriers, because the two parts of the signal may experience different channel conditions, which can result in interference between the layers multiplexed between the two, non-adjacent subcarriers (inter-layer interference).

FIG. 1 is a schematic illustration of a New Radio (NR) demodulation reference signal (DMRS) configuration type 1 with two layers, N DMRS subcarriers, and a total of 2N subcarriers. For the sake of convenience and ease of discussion, FIG. 1 depicts the even numbered subcarriers (e.g., $\{y_0, y_2 \ldots y_{2N-2}\}$). However, the odd numbered subcarriers (e.g., $\{y_1, y_3, \ldots, y_{2N-1}\}$) may be treated under substantially the same analysis as that described in more detail below. In the arrangement shown in FIG. 1, two layers (referred to herein as layer 0 and layer 1) are multiplexed across two non-adjacent subcarriers y (e.g., subcarriers $y_k$ and $y_{k+2}$). The two layers (layer 0 and layer 1) correspond to two channels, which are represented, in the frequency domain, by their respective channel coefficients $h_0$ and $h_1$ (see, e.g., FIG. 2).

In addition, for the sake of convenience, the below discussion refers to the case of DMRS configuration type 1 in 5 G New Radio (NR), where the ratio of subcarriers to DMRS reference signals is 2:1. However, embodiments of the present disclosure may also be applied in other configurations having different ratios between the number of reference signals and the number of carriers. Speaking generally, the ratio of subcarriers to reference signals may be Q to 1 (e.g., QN subcarriers and N reference signals). In these cases, separate groups of non-adjacent subcarriers may be processed together. For example, in the case of Q=3, subcarriers $\{y_0, y_3, \ldots, y_{N-3}\}$ may be processed together, subcarriers $\{y_1, y_4 \ldots y_{N-2}\}$ may be processed together, and subcarriers $\{y_2, y_5, \ldots, y_{N-1}\}$ may be processed together. More concretely, subcarriers may be grouped together where the m-th group of subcarriers $\{y\}_m$ is defined by:

$$\{y\}_m = \{y_k \text{ where } k \bmod Q = m\}$$

As shown in FIG. 1, for the zeroth subcarrier $y_0$, the FD-OCC code is [1, 1], signifying that the channel coefficients in the frequency domain $h_0$ corresponding to layer 0 are multiplied by a coefficient of 1 and that the channel coefficients in the frequency domain $h_1$ corresponding to layer 1 are also multiplied by a coefficient of 1. Accordingly, the signal received $y_0$ at the zeroth subcarrier is given by the sum of the components of the channel coefficients h corresponding to layer 0 and layer 1 multiplied by the DMRS sequence $r_0$ for the zeroth subcarrier:

$$y_0 = h_{0,0} r_0 + h_{1,0} r_0$$

Similarly, for the second subcarrier $y_2$, the FD-OCC code is [1, −1], signifying that the channel coefficients in the frequency domain $h_0$ corresponding to layer 0 are multiplied by a coefficient of 1 and that the channel coefficients in the frequency domain $h_1$ corresponding to layer 1 are multiplied by a coefficient of −1. Accordingly, the signal received $y_2$ at the second subcarrier is given by the difference of the components of the channel coefficients h corresponding to layer 0 and layer 1 multiplied by the DMRS sequence $r_2$ for the second subcarrier:

$$y_2 = h_{0,2} r_2 - h_{1,2} r_2$$

This can be generalized to a k-th subcarrier and a k+2-th subcarrier:

$$y_k = h_{0,k} r_k + h_{1,k} r_k$$

$$y_{k+2} = h_{0,k+2} r_{k+2} - h_{1,k+2} r_{k+2}$$

where $r_k$ is the DMRS sequence for the k-th subcarrier, and $r_{k+2}$ is the DMRS sequence for the k+2-th subcarrier. (For the sake of clarity, in this discussion of the received signal y, the additive receiver noise, e.g., additive white Gaussian noise (AGWN), is omitted. However, it would be understood to one of ordinary skill in the art that the received signal typically includes some noise.) By way of example, the FD-OCC codes alternate between [1,1] and [1, −1]. For the even numbered subcarriers k discussed in this example, the FD-OCC is [1,1] when k/2 is even and the FD-OCC is [1, −1] when k/2 is odd. (For odd numbered subcarriers not discussed in detail in this example, the FD-OCC is [1,1] when (k−1)/2 is even and the FD-OCC is [1, −1] when (k−1)/2 is odd.)

The descrambled signals $d_k$ and $d_{k+2}$ to be received on the k-th subcarrier and k+2-th subcarrier can be calculated by multiplying the received signals $y_k$ and $y_{k+2}$ by the complex conjugate of the known DMRS sequences $r_k$ and $r_{k+2}$ to arrive at:

$$d_k = h_{0,k} + h_{1,k}$$

$$d_{k+2} = h_{0,k+2} - h_{1,k+2}$$

where the + versus − in $d_k$ versus $d_{k+2}$ arises from the different FD-OCC codes ([1,1] versus [1,−1]) applied to $d_k$ and $d_{k+2}$.

Comparative techniques for separating the channel coefficients $h_0$ and $h_1$ corresponding to layers 0 and 1 involve despreading the received signals in the frequency domain, where the estimated channel coefficients in the frequency domain $\hat{h}_{0,k+1}$ corresponding to layer 0 are computed by:

$$\hat{h}_{0,k+1} = \frac{d_k + d_{k+2}}{2} = \frac{1}{2}(h_{0,k} + h_{0,k+2}) + \frac{1}{2}(h_{1,k} - h_{1,k+2})$$

(essentially, $h_0$ is recovered by adding $d_k$ to $d_{k+2}$ such that the $h_0$ terms are added together then divided by 2 to remove the duplication, and such that the $h_1$ terms cancel out). Similarly, the estimated channel coefficients in the frequency domain $\hat{h}_{1,k+1}$ corresponding to layer 1 are computed by:

$$\hat{h}_{1,k+1} = \frac{d_k - d_{k+2}}{2} = \frac{1}{2}(h_{1,k} + h_{1,k+2}) + \frac{1}{2}(h_{0,k} - h_{0,k+2})$$

(essentially, $h_1$ is recovered by subtracting $d_{k+2}$ from $d_k$ such that the $h_1$ terms are added together and then divided by 2 to remove the duplication, and such that the $h_0$ terms cancel out). Both layers are conventionally placed in odd subcarriers (k+1), because k+1 is the middle point between subcarrier k and subcarrier k+2 (the two subcarriers over which the FD-OCC spreading is applied).

The estimated channel coefficients in the time-domain $\hat{h}_{TD,0}(n)$ for layer 0 can be computed by applying an inverse Fourier transform (such as an inverse fast Fourier transform (IFFT)) to the channel coefficients in the frequency-domain $\hat{h}_{0,k,+1}$:

$$\hat{h}_{TD,0}(n) = \sum_{k=0}^{N-2} \hat{h}_{0,2k+1} e^{j2\pi \frac{kn}{N}}$$
$$= \sum_{k=0}^{N-2} \frac{1}{2}(h_{0,2k} + h_{0,2k+2}) e^{j2\pi \frac{kn}{N}} +$$
$$\frac{1}{2}(h_{1,2k} - h_{1,2k+2}) e^{j2\pi \frac{kn}{N}}$$

where N is half the 2N of subcarriers (because this expression considers only the even-numbered subcarriers) and where N also specifies the size of the inverse Fourier transform. The estimated channel coefficients in the time-domain $\hat{h}_{TD,1}(n)$ for layer 1 for $h_1$ may be computed by applying an inverse Fourier transform to the above expression for the estimated channel $\hat{h}_{1,k+1}$. In the general case of QN subcarriers and N reference signals, the step size of 2 k in the above expression (e.g., $h_{0,2k}$) would become steps of size Qk (e.g., $h_{0,Qk}$).

In the above expressions for the estimated channel coefficients in the frequency domain $\hat{h}_{0,k+1}$ and $\hat{h}_{1,k+1}$ for layers 0 and 1, respectively, the terms:

$\frac{1}{2}(h_{1,k}-h_{1,k+2})$ and $\frac{1}{2}(h_{0,k}-h_{0,k+2})$ represent cross-layer interference arising from the frequency domain despreading, which is non-zero when $h_{i,k} \neq h_{i,k+2}$. These cross-layer interference terms appear in the calculated channel coefficients in the time-domain $\hat{h}_{TD,0}(n)$ corresponding to layer 0 as the interference from layer 1:

$$\sum_{k=0}^{N-2} \frac{1}{2}(h_{1,2k} - h_{1,2k+2}) e^{j2\pi \frac{kn}{N}}$$

and a similar term would appear in the calculated channel coefficients in the time-domain $\hat{h}_{TD,1}(n)$ corresponding to layer 1, representing the cross-layer interference from layer 0.

As discussed above, this cross-layer interference can arise due to the frequency-selective channels, which are more likely in the case of non-adjacent subcarriers (e.g., $y_k$ and $y_{k+2}$).

Aspects of embodiments of the present disclosure relate to separating two layers that are multiplexed by a frequency-domain orthogonal cover code (FD-OCC) in the time domain. This can be compared with performing the layer separation in the frequency domain, as discussed above. This approach improves the preservation of orthogonality of the signals in the presence of frequency-selective channels and results in improvements in the block error rate (BLER) of the estimated received signal, especially for large subcarrier spacings (e.g., 30 kHz).

Figure 2:
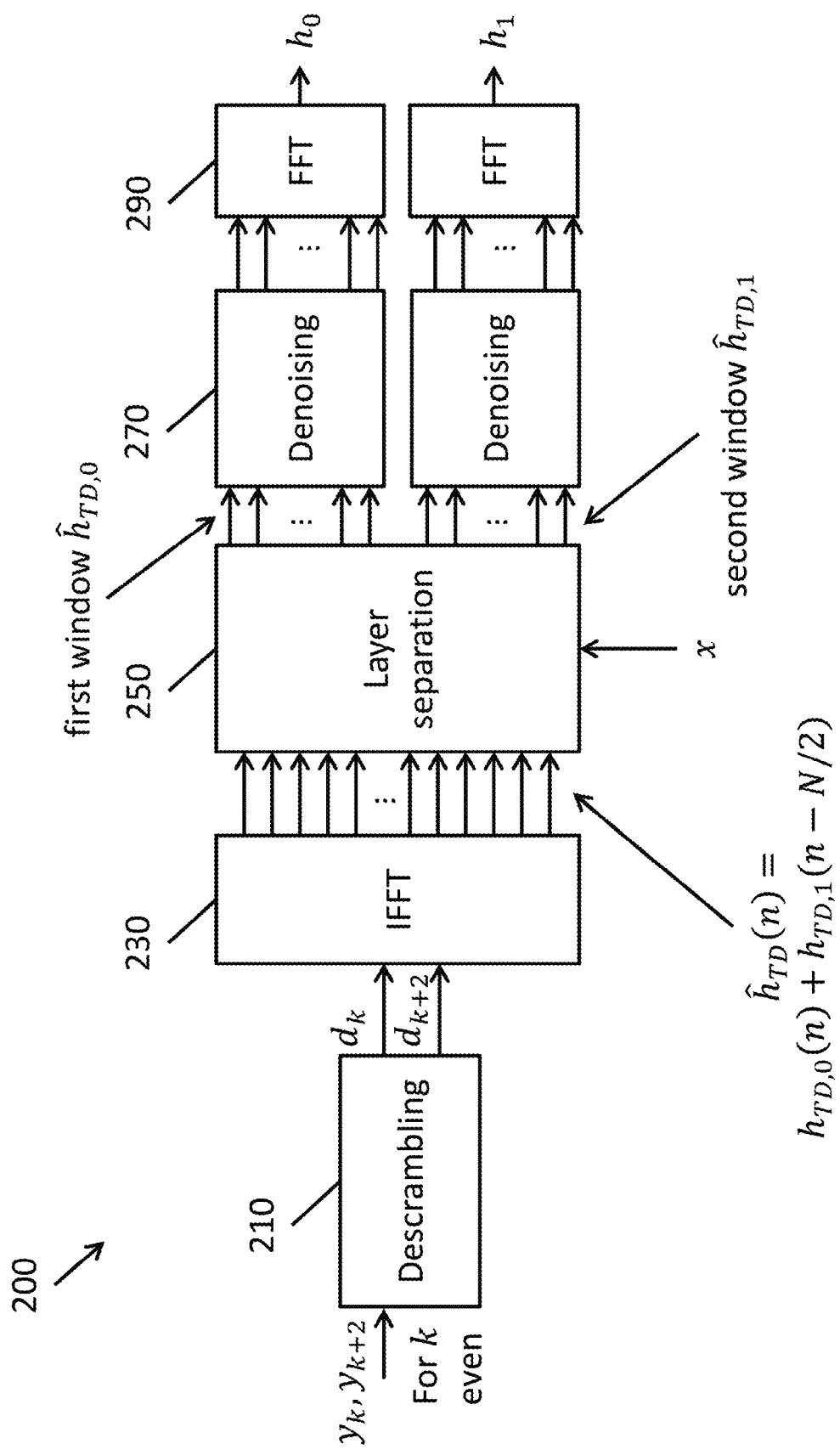
FIG. 2 is a block diagram of a receiver circuit for separating layers of a received signal according to one embodiment of the present disclosure.

FIG. 2 is a block diagram of a receiver circuit for separating a received signal according to one embodiment of the present disclosure. As shown in FIG. 2, a receiver circuit 200 (or layer separation receiver circuit) according to one embodiment includes a descrambling sub-circuit 210, an inverse Fourier transform sub-circuit 230 (e.g., an inverse fast Fourier transform sub-circuit), a layer separation sub-circuit 250, a denoising sub-circuit 270, and a Fourier transform sub-circuit 290 (e.g., a fast Fourier transform sub-circuit). Components of the receiver circuit 200 may be referred to herein as circuits or sub-circuits.

Figure 3:
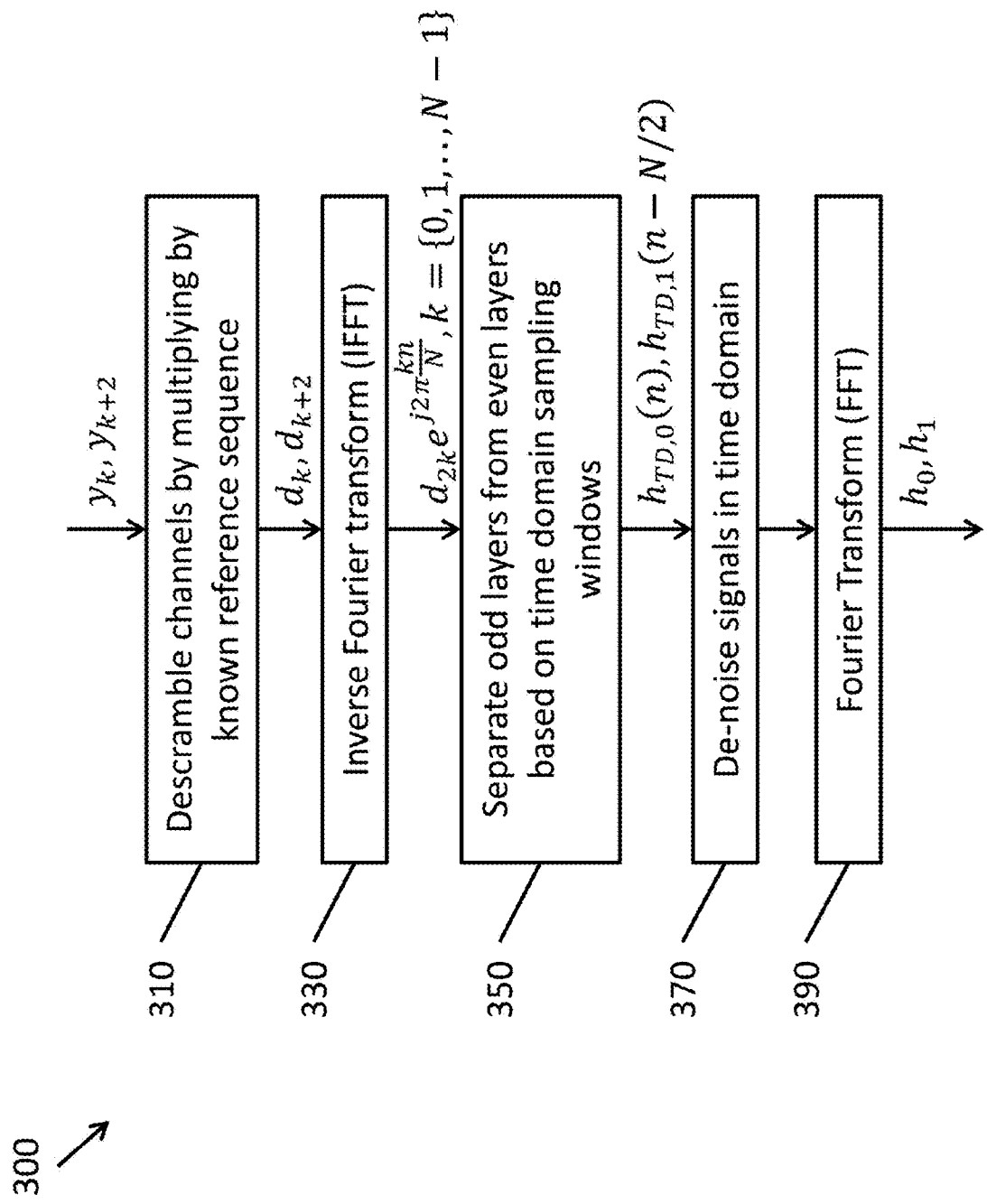
FIG. 3 is a flowchart of a method for separating layers of a signal according to one embodiment of the present disclosure.
Figure 4A:
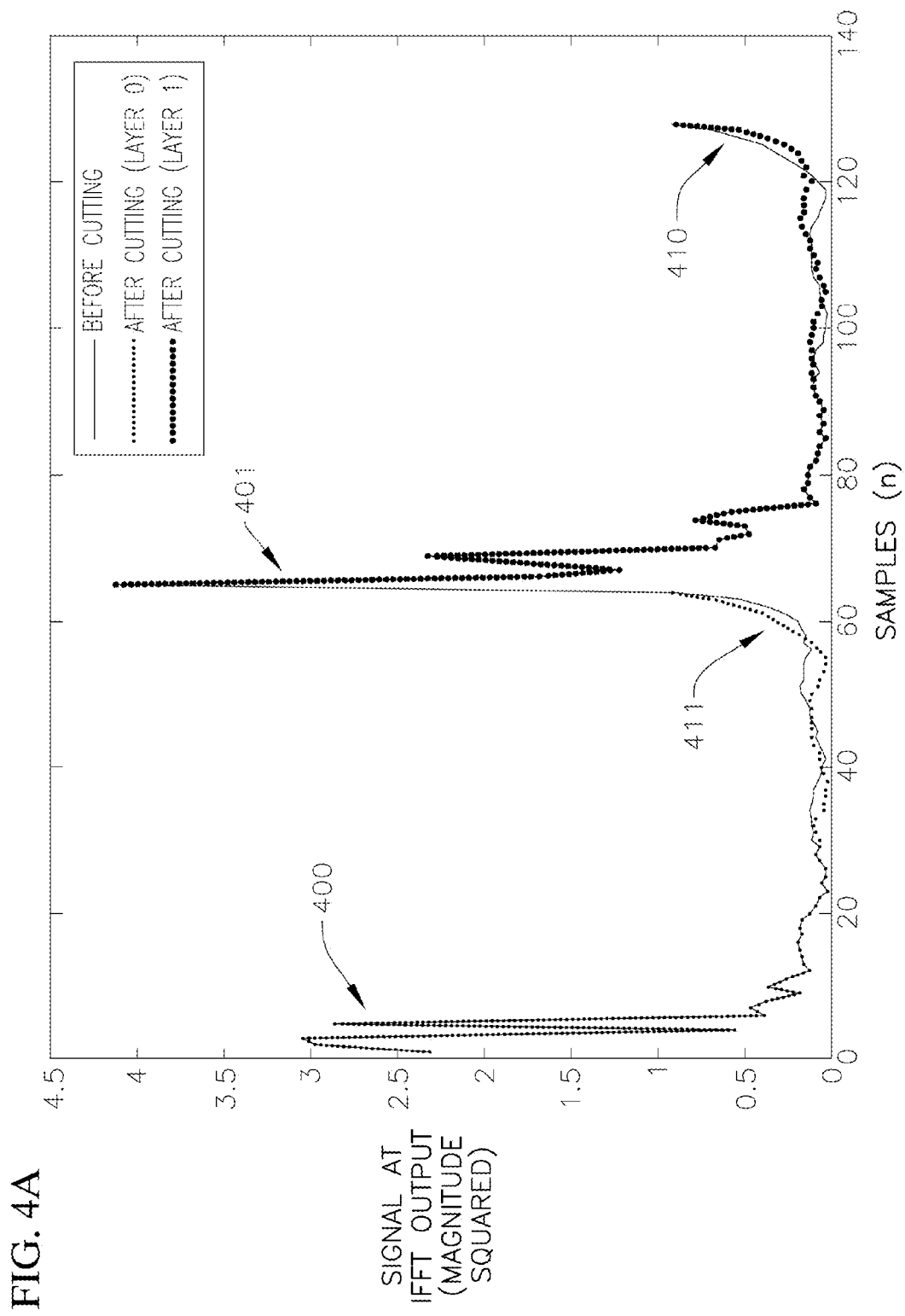
FIG. 4A is a time domain representation of a received signal separated in the time domain according to one embodiment of the present disclosure.

FIG. 3 is a flowchart of a method for separating a signal by a receiver circuit 200 according to one embodiment of the present disclosure. FIG. 4A is a time domain representation of a received signal separated in the time domain according to one embodiment of the present disclosure. For the sake of convenience, FIGS. 2 and 3 merely show the case of demodulating even numbered subcarriers (e.g., for subcarriers where k is even), shown as $y_k$ and $y_{k+2}$, to receive layers 0 and 1. However, one of ordinary skill in the art would understand that, in the present example of 5 G NR DMRS configuration type 1, the odd subcarriers of the OFDM signal can be demodulated concurrently to receive additional layers on the odd subcarriers y. Similarly, in the cases of modulation arrangements with different ratios of subcarriers to reference signals (e.g., QN subcarriers and N reference signals), each set of subcarriers may be processed independently.

As shown in FIGS. 2 and 3, the received signals $y_k$, $y_{k+2}$ are supplied to a descrambling circuit 210 of the receiver circuit 200 to descramble the signals in operation 310 of method 300. As discussed above, the received signals $y_k$, $y_{k+2}$ may take the form:

$y_k = h_{0,k} r_k + h_{1,k} r_k$ $y_{k+2} = h_{0,k+2} r_{k+2} - h_{1,k+2} r_{k+2}$ which are scrambled by reference sequences $r_k$ and $r_{k+2}$. As noted above, the + versus − in $y_k$ versus $y_{k+2}$ arises from the different FD-OCC codes of [1,1] versus [1, −1] applied to $y_k$ and $y_{k+2}$. The received signals $y_k$ and $y_{k+2}$ are multiplied by the complex conjugates of the known reference sequences $r_k$ and $r_{k+2}$ for the k-th subcarrier and the k+2-th subcarrier to obtain the descrambled signals $d_k$ and $d_{k+2}$, such as:

$d_k = h_{0,k} + h_{1,k}$ $d_{k+2} = h_{0,k+2} - h_{1,k+2}$

An inverse Fourier transform circuit (e.g., an inverse fast Fourier transform (IFFT) circuit) 230 transforms the descrambled signals $d_k$ and $d_{k+2}$ from the frequency domain to the time domain in operation 330.

Mathematically, an inverse Fourier transform of size N is applied to the received signal, without despreading, to compute the channel coefficients in the time-domain $\hat{h}_{TD}(n)$ of the received signal:

$$\hat{h}_{TD}(n) = \sum_{k=0}^{N-1} d_{2k} e^{j2\pi \frac{kn}{N}}$$

substituting the above definition of $d_k = h_{0,k} + h_{1,k}$ and separating the terms where k is even versus where k is odd to account for the different FD-OCCs ([1, 1] versus [1, −1]):

$$\hat{h}_{TD}(n) = \sum_{k \text{ even}} (h_{0,2k} + h_{1,2k}) e^{j2\pi \frac{kn}{N}} + \sum_{k \text{ odd}} (h_{0,2k+2} - h_{1,2k+2}) e^{j2\pi \frac{kn}{N}}$$

collecting the channel coefficients $h_0$ terms corresponding to layer 0 and the channel coefficients $h_1$ terms corresponding to layer 1:

$$\hat{h}_{TD}(n) = \sum_{k=0}^{N-1} h_{0,2k} e^{j2\pi \frac{kn}{N}} + \sum_{k=0}^{N-1} (-1)^k h_{1,2k} e^{j2\pi \frac{kn}{N}}$$

noting that $$(-1)^k = e^{-j\pi k} = e^{-j2\pi \frac{kN}{N/2}},$$

the above expression can be rewritten as:

$$\hat{h}_{TD}(n) = \sum_{k=0}^{N-1} h_{0,2k} e^{j2\pi \frac{kn}{N}} + \sum_{k=0}^{N-1} h_{1,2k} e^{j2\pi \frac{k}{N}(n - \frac{N}{2})}$$

which is equivalent to:

$$\hat{h}_{TD}(n) = h_{TD,0}(n) + h_{TD,1}\left(n - \frac{N}{2}\right).$$

Therefore, as seen in the equations above, the portion of the signal corresponding to the layer 0 channel $h_{TD,0}$ appears in the first half of the samples of $\hat{h}_{TD}(n)$, while the portion of the signal corresponding to the layer 1 channel $h_{TD,1}$ is shifted by N/2 samples (e.g., occurs in the second half of the N samples). In other words, the layers multiplexed by FD-OCC appear as two shifted versions of the channel impulse response (CIR), as shown as 400 and 401 in FIG. 4A.

As such, in some embodiments, in operation 350, the layer separation circuit 250 separates the two layers (the layer 0 channel $h_0$ and the layer 1 channel $h_1$ or, more formally, the channel coefficients $h_0$ corresponding to layer 0 and the channel coefficients $h_1$ corresponding to layer 1) by cutting or splitting the signal in the time domain in accordance with two windows (a "first window" and a "second window") so that each window contains one of the CIRs ("cutting" the two full CIRs into two parts), as indicated in FIG. 4A by the heavy dotted line versus the light dotted line used to represent the two parts corresponding to the two layers. More formally, the first N/2 data points can be taken as the channel coefficients, in the time domain, corresponding to layer 0 (e.g., a first window of data points $$\left[0, \frac{N}{2} - 1\right])$$

and the next N/2 data points can be taken as the channel coefficients, in the time domain, corresponding to layer 1 (e.g., a second window of data points $$\left[\frac{N}{2}, N - 1\right]).$$

Merely cutting the received signal into two parts at N/2, as described above, can cause portions of the signal that correspond to leakage from the IFFT operation to be omitted from the signal. See, for example, layer 0 leakage 410 at around n=120 as shown in FIG. 4A and layer 1 leakage 411 at around n=60 to the left of the "cut" at n=70.

Figure 4B:
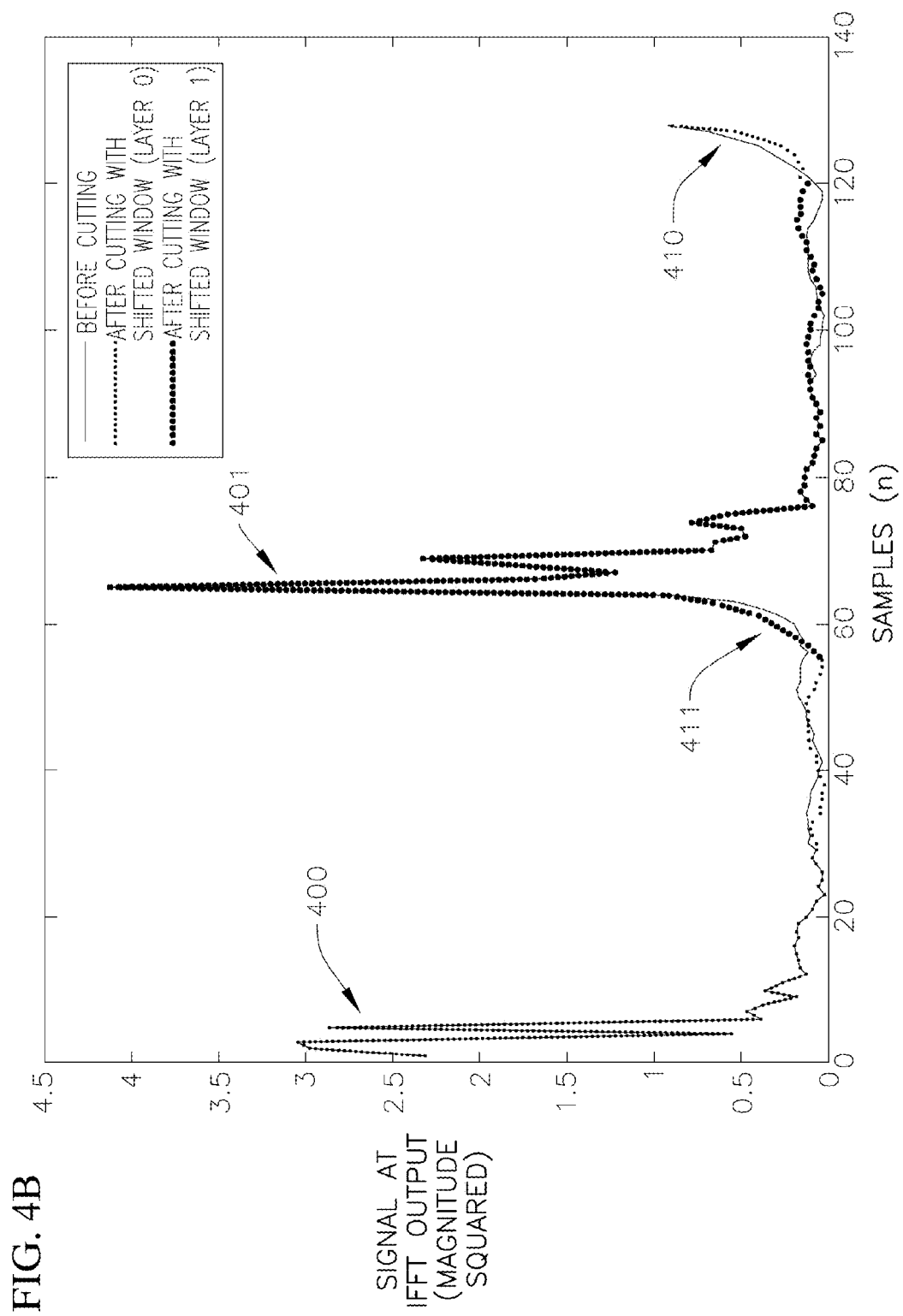
FIG. 4B is a time domain representation of a received signal separated in the time domain using a shifted window according to one embodiment of the present disclosure.

Therefore, in some embodiments of the present disclosure, in operation 350 the layer separation circuit 250 shifts the windows earlier in time in order to include the "leakage" 410 and 411. FIG. 4B is a time domain representation of a received signal separated in the time domain using a shifted window according to one embodiment of the present disclosure.

In more detail, in some such embodiments, layers indexed by even numbers (counting from 0, such as $h_0$) are extracted from samples (wrapping around the end of $\hat{h}_{TD}(n)$), $$\left[0, \frac{N}{2} - x\right] \text{ and } [N - x, N - 1]$$

and layers indexed by odd numbers (such as $h_1$) are extracted from the samples in the intervals:

$$\left[\frac{N}{2}, N - 1 - x\right] \text{ and } \left[\frac{N}{2} - x, \frac{N}{2} - 1\right]$$

or, in other words, the layers indexed by odd numbers are extracted from samples in the interval:

$$\left[\frac{N}{2} - x, N - 1 - x\right]$$

The amount or magnitude of the shift is set based on various conditions particular to the channels. In some embodiments, the amount of the expansion x is set as x=round(0.27 N), where the "round" function rounds its given argument to the nearest integer.

In some embodiments, a de-noising circuit 270 de-noises the separated signals in the time domain in operation 370. In some embodiments, the de-noising is performed by a per-tap minimum mean square error (MMSE) filter, which assigns a weight to each tap of the estimated channel impulse response, where each of the weights is assigned based on the relative signal and noise power for its corresponding tap. While FIG. 2 shows multiple denoising circuits 270 arranged in parallel, this is a conceptual representation, and embodiments of the present disclosure are not limited thereto. In some embodiments, multiple parallel streams of signals may be processed by the same denoising circuit 270. For example, the separated signals in the time domain may be sequentially denoised, one at a time, by a single denoising circuit 270.

The channel coefficients in the time domain $h_{TD,0}(n)$ and $h_{TD,1}(n)$ may then be provided to a Fourier transform circuit (e.g., a fast Fourier transform circuit or FFT circuit) 290 to Fourier transform the time domain signals to frequency domain signals $h_0$ and $h_1$ in operation 390. The frequency domain signals $h_0$ and $h_1$ may then be subjected to further processing (e.g., to separate multiple streams of data multiplexed within the signals). While FIG. 2 shows multiple Fourier transform circuits 290 arranged in parallel, this is a conceptual representation, and embodiments of the present disclosure are not limited thereto. In some embodiments, multiple parallel streams of signals may be transformed by the same Fourier transform circuit 290. For example, the separated signals in the time domain may be sequentially transformed, one at a time, by a single Fourier transform circuit 290.

Figure 5:
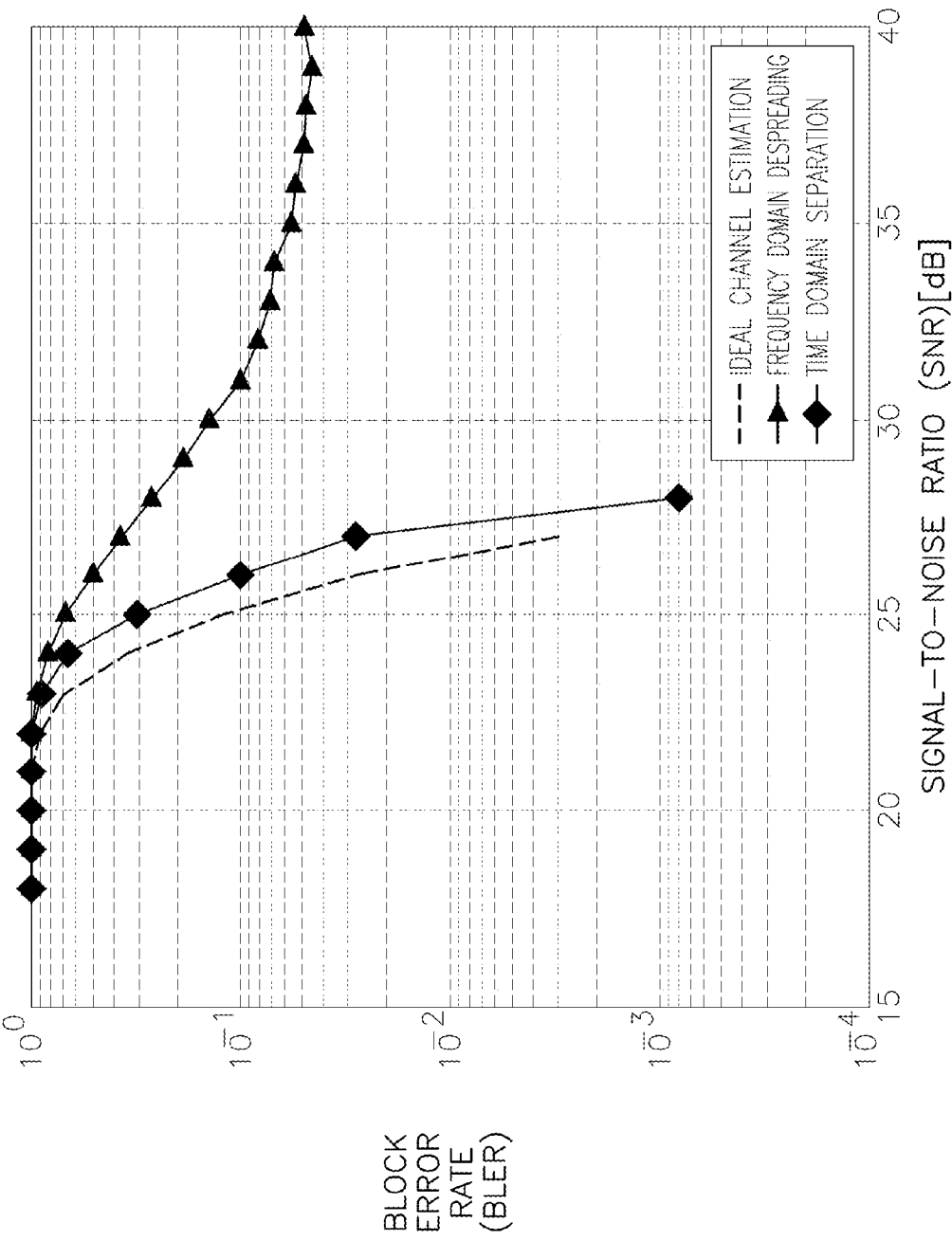
FIG. 5 is a graph illustrating a block error rate (BLER) performance of embodiments of the present disclosure in comparison to comparative receivers and in comparison to an ideal receiver.
Figure 6:
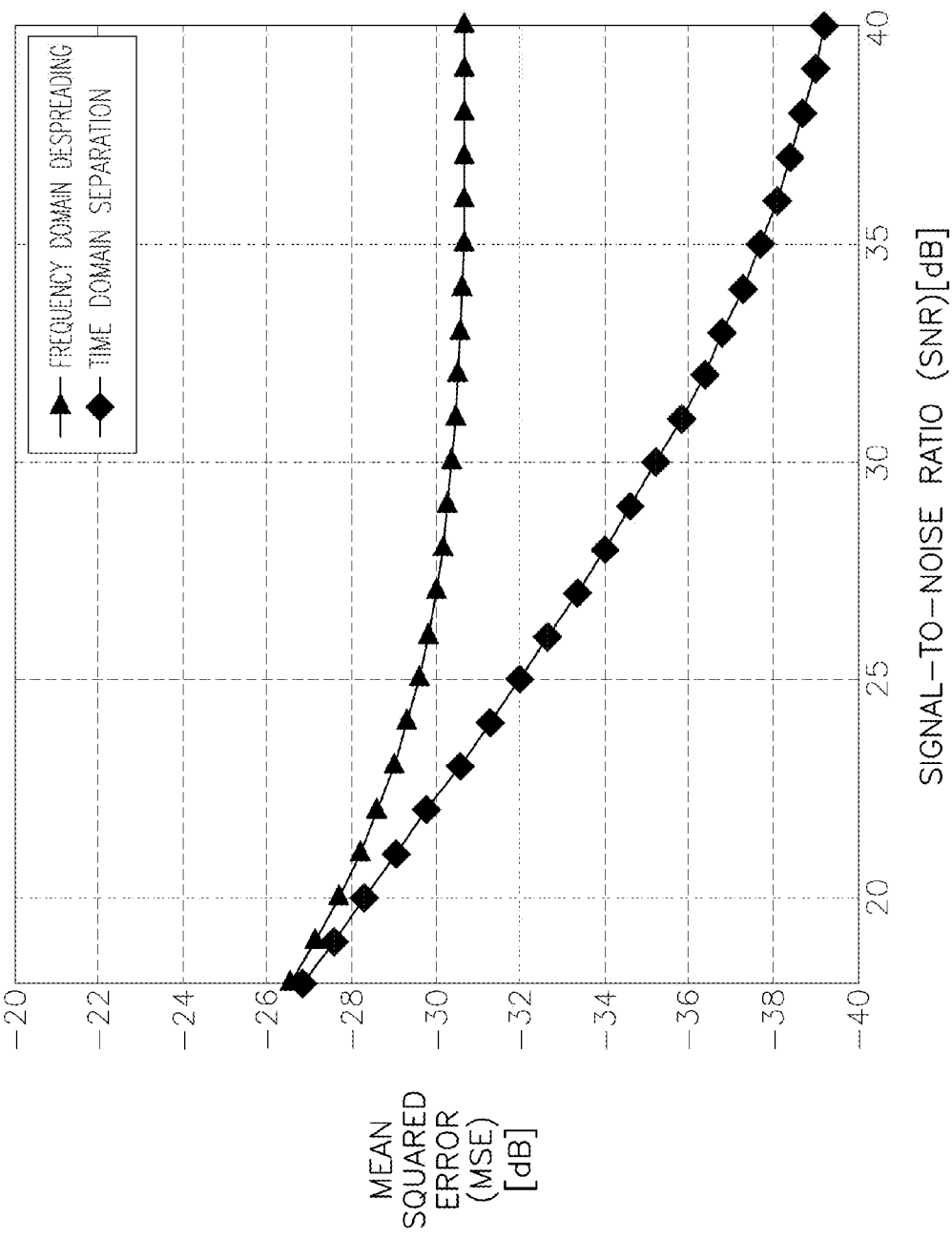
FIG. 6 is a graph illustrating a mean squared error (MSE) performance of embodiments of the present disclosure in comparison to comparative receivers and in comparison to an ideal receiver.

FIG. 5 is a graph illustrating a block error rate (BLER) performance of embodiments of the present disclosure in comparison to comparative receivers and in comparison to an ideal receiver. FIG. 6 is a graph illustrating a mean squared error (MSE) performance of embodiments of the present disclosure in comparison to comparative receivers and in comparison to an ideal receiver. In more detail, FIGS. 5 and 6 show simulated results for the case of 30 kHz subcarrier spacing, Rank 2 (2 layers or streams of data transmitted in parallel), 100 MHz bandwidth, under the modulation and coding scheme (MCS) 19 of 5 G NR and with a channel profile of "Extended Vehicular A, Doppler frequency of 30 kHz" (EVA 30).

As shown in FIG. 5, embodiments of the present disclosure (the curve labeled "Time Domain Separation") exhibit significantly lower block error rate (BLER) than the comparative technique (the curve labeled "Frequency Domain Despreading") for a wide range of signal to noise ratio (SNR) values (e.g., SNR greater than 22 dB), as well as performance that approaches the ideal performance (the curve labeled "Ideal Channel Estimation"). As shown in FIG. 6, embodiments of the present disclosure (the line labeled "Time Domain Separation") exhibit significantly lower mean square error (MSE) than the comparative technique (the line labeled "Frequency Domain Despreading") across the range of SNR values (e.g., from 18 to 40 dB).

Figure 7:
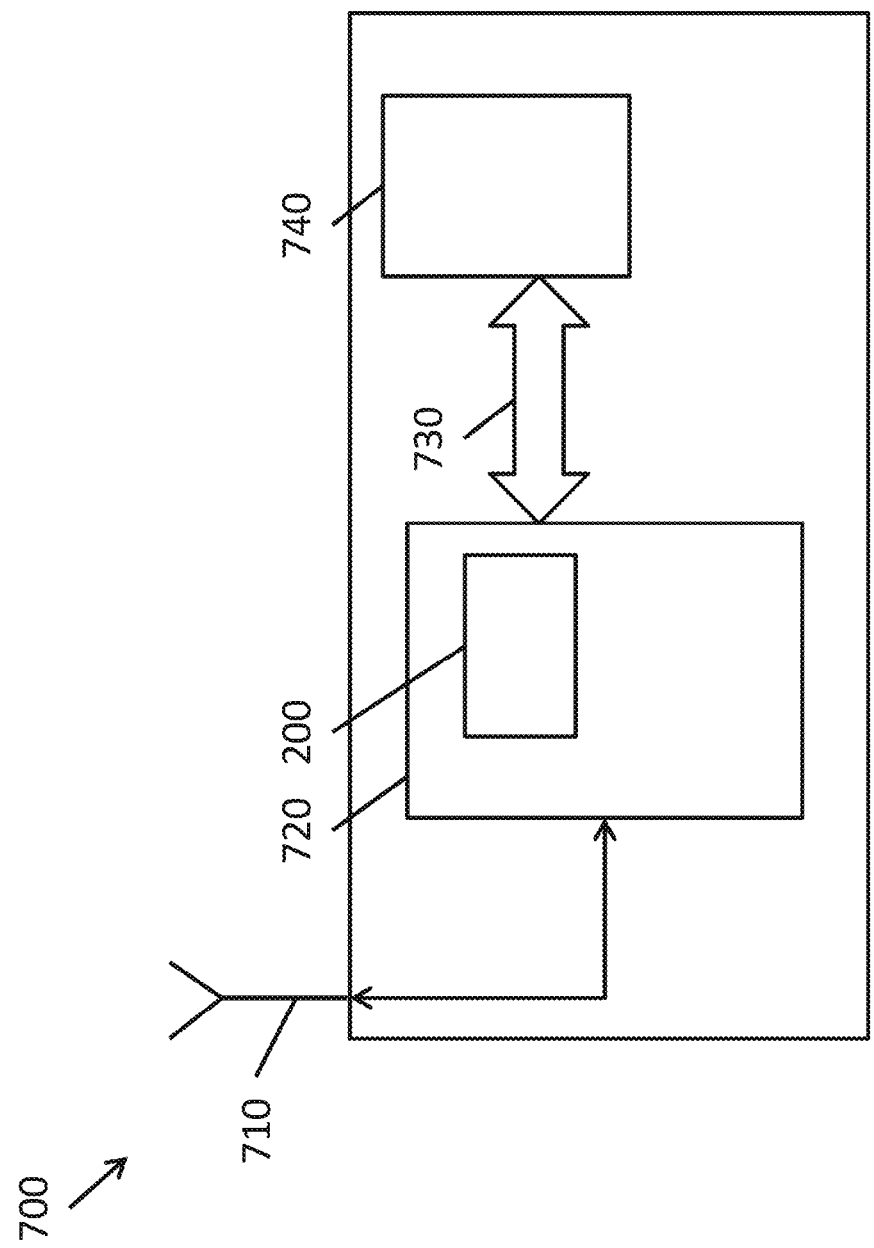
FIG. 7 is a block diagram of a wireless communication device in accordance with one embodiment of the present disclosure.

FIG. 7 is a block diagram of a wireless communication device in accordance with one embodiment of the present disclosure. The wireless communication device may be, for example, user equipment (UE) such as a mobile phone (e.g., a cell phone), a tablet computer, a laptop computer, a mobile hotspot, and the like equipped with a cellular radio. The wireless communication device may also be a node in a wireless communication network (e.g., a cellular base station or base transceiver station). In some embodiments of the present disclosure, the wireless communication device may be used with other forms of wireless communications, such as wireless local area networks (e.g., a network based on Wi-Fi or IEEE 802.11 standards).

As shown in FIG. 7, in some embodiments, a wireless communication device 700 includes one or more antennas 710 configured to transmit and receive electromagnetic signals. Received electromagnetic signals may be supplied to one or more signal processing circuits 720. These signal processing circuits 720 may include the receiver circuit 200 illustrated in FIG. 2. The signal processing circuits 720 may also include, for example, filter banks (e.g., low pass, high pass, and/or band pass filters), amplifiers (e.g., for amplifying received signals and/or for amplifying generated signals for transmission), analog to digital converters (ADCs), digital to analog converters (DACs), and/or the like. The signal processing circuits 720 may be configured to transmit and receive digital signals (e.g., streams of data bits) on a data bus 730 to and from computing components 740. The computing components 740 may include, for example, random access memory (e.g., dynamic random access memory (DRAM)), persistent memory (e.g., flash memory), a microprocessor, input/output controllers, and/or the like. In some embodiments, including those of user equipment such as mobile phones, tablet computers, and the like, the wireless communication device 700 may include one or more user interface devices such as a touch sensitive display panel, a speaker, a microphone, and a camera. In some embodiments, such as those where the wireless communication device 700 is a node in a wireless communication network, the wireless communication device 700 may include additional networking hardware such as an Ethernet adapter and/or a wireless LAN adapter (e.g., for Wi-Fi or the like).

In various embodiments of the present disclosure, the signal processing circuits 720, the receiver circuit 200, and the sub-circuits of the receiver circuit 200 may be implemented in one or more different ways, including analog, digital, and mixed signal components. In some embodiments of the present disclosure, an application specific integrated circuit (ASIC) such as a digital signal processor (DSP) is used to implement one or more of the circuits. In some embodiments, a field programmable gate array (FPGA) is used to implement the various sub-circuits. In some embodiments, some aspects, such as the inverse Fourier transform sub-circuit or inverse fast Fourier transform sub-circuit may be implemented using an application specific core (e.g., a digital signal processing core) that within an FPGA. In some embodiments, one or more sub-circuits are implemented in computer code that is executed by a processor (e.g., in the case of "software-defined radio"). The receiver may also be implemented as a component or sub-circuit of a System on a Chip (SoC).

Accordingly, embodiments of the present disclosure provide systems and methods for separating layers encoded in OFDM signals more reliably than comparative techniques. Some embodiments of the present disclosure relate to techniques for separating layers in the time domain.

While the present disclosure has been described in connection with certain exemplary embodiments, it is to be understood that the disclosure is not limited to the disclosed embodiments, but, on the contrary, is intended to cover various modifications and equivalent arrangements included within the spirit and scope of the appended claims, and equivalents thereof.

What is claimed is:

1. A method for separating a plurality of layers multiplexed using frequency domain orthogonal cover codes (FD-OCC) in an orthogonal frequency domain multiplexed (OFDM) signal, the method comprising:

descrambling a plurality of signals received on non-adjacent subcarriers of the OFDM signal based on multiplying by corresponding descrambling codes to generate a plurality of descrambled signals;

applying an inverse fast Fourier transform to transform the plurality of descrambled signals from a frequency domain to a received signal comprising a plurality of samples in a time domain; and separating the plurality of layers multiplexed in the received signal to extract, in the time domain:
one or more first layers from the samples; and
one or more second layers from the samples.

2. The method of claim 1, further comprising defining a first time domain sampling window and a second time domain sampling window,
wherein the first time domain sampling window corresponds to a first half of the samples of the received signal in the time domain, and
wherein the second time domain sampling window corresponds to a second half of the samples of the received signal in the time domain.

3. The method of claim 1, wherein the separating the layers multiplexed in the received signal comprises: defining a first time domain sampling window and a second time domain sampling window,
wherein the first time domain sampling window corresponds to a first half of the samples of the received signal in the time domain, shifted by a leakage parameter, and
wherein the second time domain sampling window corresponds to a second half of the samples of the received signal in the time domain, shifted by the leakage parameter.

4. The method of claim 3, wherein the leakage parameter has a value of an integer nearest to 0.27 times a size of the inverse fast Fourier transform.

5. The method of claim 1, further comprising applying a fast Fourier transform to the extracted one or more first layers and the extracted one or more second layers to transform the one or more first layers and the one or more second layers from the time domain to the frequency domain.

6. The method of claim 1, further comprising de-noising the extracted one or more first layers and the extracted one or more second layers to generate one or more de-noised first layers and one or more de-noised second layers.

7. The method of claim 6, further comprising: applying a fast Fourier transform to convert the one or more de-noised first layers and the one or more de-noised second layers from the time domain to the frequency domain.

8. A receiver circuit for separating a plurality of layers multiplexed using frequency domain orthogonal cover codes (FD-OCC) in an orthogonal frequency domain multiplexed (OFDM) signal, the receiver circuit comprising:
a descrambling sub-circuit configured to descramble a plurality of signals received on non-adjacent subcarriers of the OFDM signal based on multiplying the plurality of signals by corresponding descrambling codes to generate a plurality of descrambled signals;
an inverse fast Fourier transform sub-circuit configured to transform the plurality of descrambled signals from a frequency domain to a received signal comprising a plurality of samples in a time domain; and
a layer separation sub-circuit configured to separate the plurality of layers multiplexed in the received signal by extracting, in the time domain:
one or more first layers from the samples; and
one or more second layers from the samples.

9. The receiver circuit of claim 8, wherein the layer separation sub-circuit is further configured to define a first time domain sampling window and a second time domain sampling window,
wherein the first time domain sampling window corresponds to a first half of the samples of the received signal in the time domain, and
wherein the second time domain sampling window corresponds to a second half of the samples of the received signal in the time domain.

10. The receiver circuit of claim 8, wherein the layer separation sub-circuit is further configured to define a first time domain sampling window and a second time domain sampling window,
wherein the first time domain sampling window corresponds to a first half of the samples of the received signal in the time domain, shifted by a leakage parameter, and
wherein the second time domain sampling window corresponds to a second half of the samples of the received signal in the time domain, shifted by the leakage parameter.

11. The receiver circuit of claim 10, wherein the leakage parameter has a value of an integer nearest to 0.27 times a size of the inverse fast Fourier transform.

12. The receiver circuit of claim 8, further comprising a fast Fourier transform sub-circuit configured to convert the one or more first layers and the one or more second layers from the time domain to the frequency domain.

13. The receiver circuit of claim 8, further comprising a de-noising sub-circuit configured to de-noise the extracted one or more first layers and the extracted one or more second layers to generate one or more de-noised first layers and one or more de-noised second layers.

14. The receiver circuit of claim 13, further comprising a fast Fourier transform sub-circuit configured to convert the one or more de-noised first layers and the one or more de-noised second layers from the time domain to the frequency domain.

15. A wireless communication device comprising:
an antenna;
a processor;
a memory;
a plurality of signal processing circuits coupled to the processor and the memory by a data bus, the signal processing circuits comprising a receiver circuit configured to receive a plurality of layers multiplexed using frequency domain orthogonal cover codes (FD-OCC) in an orthogonal frequency domain multiplexed (OFDM) signal from the antenna, the receiver circuit comprising:
a descrambling sub-circuit configured to descramble a plurality of signals received on non-adjacent subcarriers of the OFDM signal based on multiplying the plurality of signals by corresponding descrambling codes to generate a plurality of descrambled signals;
an inverse fast Fourier transform sub-circuit configured to transform the plurality of descrambled signals from a frequency domain to a received signal comprising a plurality of samples in a time domain;
a layer separation sub-circuit configured to separate the plurality of layers multiplexed in the received signal by extracting, in the time domain:
one or more first layers from the samples; and
one or more second layers from the samples,
the signal processing circuits being configured to transmit data streams decoded from the one or more first layers and the one or more second layers to the processor and the memory.

16. The wireless communication device of claim 15, wherein the layer separation sub-circuit is further configured to define a first time domain sampling window and a second time domain sampling window, wherein the first time domain sampling window corresponds to a first half of the samples of the received signal in the time domain, shifted by a leakage parameter, and wherein the second time domain sampling window corresponds to a second half of the samples of the received signal in the time domain, shifted by the leakage parameter.

17. The wireless communication device of claim 16, wherein the leakage parameter has a value of an integer nearest to 0.27 times a size of the inverse fast Fourier transform.

18. The wireless communication device of claim 15, further comprising a fast Fourier transform sub-circuit configured to convert the one or more first layers and the one or more second layers from the time domain to the frequency domain.

19. The wireless communication device of claim 15, further comprising a de-noising sub-circuit configured to de-noise the extracted one or more first layers and the extracted one or more second layers to generate one or more de-noised first layers and one or more de-noised second layers.

20. The wireless communication device of claim 19, further comprising a fast Fourier transform sub-circuit configured to convert the one or more de-noised first layers and the one or more de-noised second layers from the time domain to the frequency domain.

\* \* \* \* \*